United States Patent [19]

Southards

[11] Patent Number: 5,895,507

[45] Date of Patent: Apr. 20, 1999

[54] DIESEL OR DUAL-FUEL ENGINE AND BLACK LIQUOR GASIFIER COMBINED CYCLE

[75] Inventor: William T. Southards, North Canton, Ohio

[73] Assignee: McDermott Technology, Inc., New Orleans, La.

[21] Appl. No.: 08/801,836

[22] Filed: Feb. 14, 1997

[51] Int. Cl.⁶ .................................. C10J 3/68; F23B 9/00
[52] U.S. Cl. ................... 48/76; 110/234; 110/239
[58] Field of Search ........................... 48/76, 197 R, 48/61; 110/234, 229

[56] References Cited

U.S. PATENT DOCUMENTS

| 4,928,635 | 5/1990 | Shelor | 122/7 R |
|---|---|---|---|
| 5,134,944 | 8/1992 | KEller et al. | 110/234 |
| 5,455,011 | 10/1995 | Kitto, Jr. | 422/116 |
| 5,634,950 | 6/1997 | McIlroy et al. | 48/18 |

OTHER PUBLICATIONS

Finchem, K., "Black Liquor Gasification Research Yields Recovery Options for Future", Pulp & Paper, Nov. 1995, pp. 49, 50, 53, 54, 57, and 59.

Marshall, B. and Ropers, H., "Fluidized Bed Reactor Offers Incremental Capacity Option", Pulp & Paper, Nov. 1995, pp. 67–69.

O'Keef, W., "Engine/Generators Reconfigured to Compete in the Next Century," Power, Oct., 1995, pp. 52, 54, 56, 58, and 61.

Bain et al., "New Gasification Technology Offers Promise For Biomass Plants," Power Engineering, Aug. 1996, pp. 32, 37–39.

Consonni et al., "Biomass–Gasifier/Aeroderivative Gas Turbine Combined Cycles: Part A—Technologies and Performance Modeling," Journal of Engineering for Gas Turbines and Power, Jul., 1996 pp. 507–515.

Berglin, N. et al., "Energy System Options With Black Liquor Gasification", 1995 Int. Chem. Recovery Conference, pp. B311–B313.

Rickard, John, "The 2020 Mill—Utility Requirements for Market Kraft Pulp", TAPPI, Mar., 1995, pp. 175–184.

Primary Examiner—Nina Bhat
Attorney, Agent, or Firm—Daniel S. Kalka; Robert J. Edwards

[57] ABSTRACT

A combined cycle power generation and chemical recovery system has a gasifier system for producing a fuel gas from a by-product of an industrial process, such as a black liquor from a paper mill and a diesel, or dual-fuel, engine/generator connected to the gasifier system to receive the fuel gas for combusting to produce electrical power. Exhaust gases from the diesel engine/generator may be used for steam generation in a boiler.

7 Claims, 1 Drawing Sheet

DIESEL OR DUAL-FUEL ENGINE AND BLACK LIQUOR GASIFIER COMBINED CYCLE

BACKGROUND OF THE INVENTION

1. Field of the Invention

The present invention relates generally to the field of energy recovery and power production systems and in particular to a black liquor or biomass gasifier combined with a diesel or dual-fuel engine and a boiler to recover chemicals and produce fuel and electrical power and high-pressure steam from the by-products of an industrial plant process, such as those of a paper mill.

2. Description of the Related Art

Environmental concerns and government regulations for pollutant levels in emissions of industrial plants have made the search for more efficient power generation necessary. The paper industry in particular has increased chemical recovery capacity and power generation needs due to changing processes designed to meet new and anticipated standards.

Electrical power requirements are often outpacing fossil fuel or steam generation requirements in newer paper mills. The increased electrical power needs arise from the addition of environmental control equipment and recycled, mechanical and semi-chemical pulp co-production processes.

Black liquor and biomass gasifiers for commercial use are currently being developed by several companies. Gasifiers can be used to process by-products, such as black liquor or biomass material into usable fuel gas. Conventionally, the clean gas produced by the gasifier components is used to drive gas turbines.

Several different gasifiers are described in the following publications: Finchem, K. J., "Black Liquor Gasification Research Yields Recovery Options for Future," Pulp & Paper, November 1995; Berglin, N., et al., "Energy System Options with Black Liquor Gasification," 1995 International Chemical Recovery Conference Pre-Prints, Vol. B, pp. B311–B315, CPPA, Montreal, Quebec, Canada, April 1995; Richard, J. C., "The 2020 Mill—Utility Requirements for Market Kraft Pulp," Tappi Journal, March, 1995, Vol. 78, No. 3, pp. 175–184; Bain, R. L., et al.,"New Gasification Technology Offices Promise for Biomass Plants," Power Engineering, August 1996, pp. 32–39; Consinni, S. Larson, "Biomass—Gasifier/Aeroderivative Gas Turbine Combined Cycles Part A—Technologies and Performance Modeling," Journal of Engineering for Gas turbines and Power, July 1996, Vol. 118, pp. 507–515.

These references describe combining a gasifier with a gas turbine to drive generators for producing electrical power. The use of gas turbines with gasifiers suffers from the requirement that high gasifier pressures are required to operate the turbines efficiently. The generated gas from the gasifiers must be thoroughly cleaned of contaminants such as particulates, tar, and alkali metals to avoid damage to the turbines. The turbine blades can erode, accumulate deposits or fail from excessive exposure to these contaminants. Turbine manufacturers have strict specifications for the allowable contaminant levels. Additional operating and maintenance procedures, and reduced turbine operating temperatures, and thus reduced turbine efficiency and output can result if higher levels of the contaminants are present. A higher fuel gas heating value per unit volume is required for current gas turbine designs than for dual-fuel engines and some gasifier designs operate below the limiting value for gas turbines. This would require co-firing with a significant quantity of higher quality auxiliary fuel to make use of a gas turbine feasible.

Diesel engines, or dual-fuel engines which use added diesel or distillate fuel to achieve compression ignition, have been used in power generation plants, burning gas, oil or lower quality gaseous fuels such as land-fill gas, mine gas, or gas from sewage digesters. Hereinafter "diesel engine" is intended to encompass both diesel engines and dual-fuel engines for purposes of this application. O'Keefe, W. "Engine Generators Reconfigured to Compete in the Next Century," Power, October 1995, pp. 52–62 generally describes the use of diesel or dual-fuel engines for electrical power generation.

Diesel engines have several advantages over gas turbines. Gas turbines generally produce large volumes of hot gas for steam generation. When steam production is not required, gas turbines which must still produce electrical power run at a lower cycle efficiency, and produce exhaust gas without having a process to use it. Diesel engines by contrast automatically adjust air flow during periods of decreased loading and eliminate this problem, remaining more efficient even at low loads. Diesel engines can operate using fuel gas having a higher level of contaminants than gas turbines allow. Production of pollutants such as $NO_x$ are also reduced by diesel engines operated in a dual-fuel configuration with very low levels of auxiliary fuel. Technologies to reduce pollutants from diesel engines to acceptable levels exist commercially. When combined with a boiler system and conventional gas cleanup, the level of NOx and SOx produced per unit of electrical power generated is lower than a comparable conventional design.

SUMMARY OF THE INVENTION

It is an object of the present invention to provide a new combined cycle power generation system having improved efficiency and an economic advantage over conventional gas turbine/gasifier systems.

It is a further object of the invention to provide a combined cycle power generation system for industrial processes having increased electrical power and chemical recovery needs.

Accordingly, a diesel engine is combined with a gasifier system in a combined cycle power generation and chemical recovery system to provide electrical power and hot exhaust gases which can be used for steam generation in a boiler. The gasifier system has a gasifier, a heat recovery unit, a chemical recovery unit and a gas cleanup unit for producing and treating fuel gas from black liquor, biomass or other material.

Treated fuel gas from the gasifier system is fed to a diesel engine, which combusts the fuel gas and drives a generator to produces electric power. Exhaust gas from the diesel engine may be used to help heat water in a boiler to produce steam more efficiently.

The gasifier aids in the recovery of usable compounds from by-products of industrial processes. Additionally, heat obtained with the heat recovery unit may be used to help raise the steam or preheat air, oxygen or oxygen-enriched air needed by the gasifier. Green liquor is produced as a result of the black liquor gasification process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only drawing is a schematic diagram showing the relation of the components of a combined cycle system according to the invention.

DESCRIPTION OF THE PREFERRED EMBODIMENTS

Figure 1:
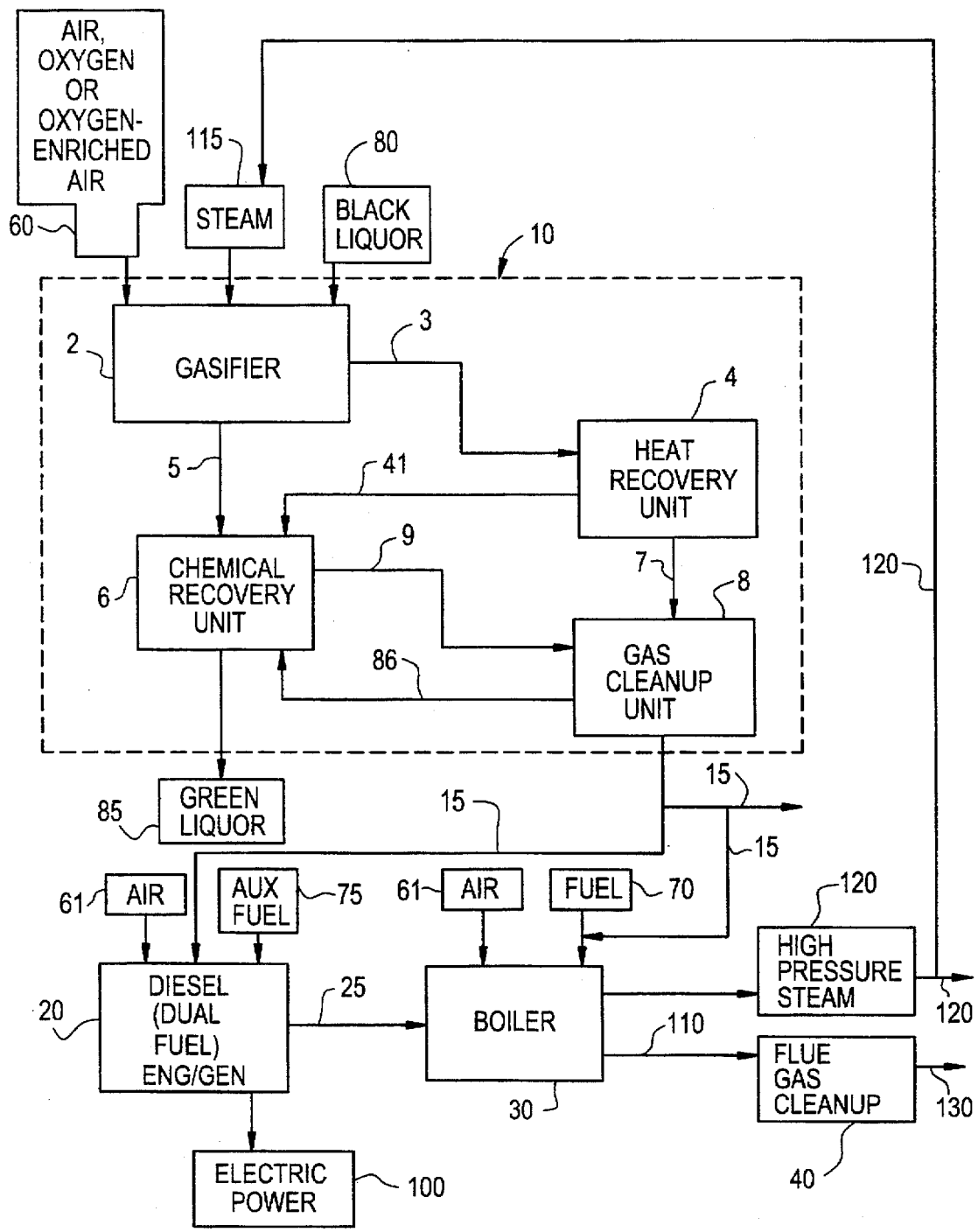

Referring now to the drawing, in which similar elements are identified by like reference numerals, FIG. 1 shows a combined cycle system having a gasifier system, generally designated 10 connected to a diesel, or dual-fuel, engine/generator 20. Clean gas 15 from the gasifier system 10 is provided to the diesel engine/generator 20 for combustion to produce electric power 100 and exhaust gases 25. Clean gas 15 that is not required to produce electrical power may be used to fuel the boiler 30, or be exported from the system as a product gas.

Gasifier system 10 has black liquor gasifier 2 which uses air, oxygen, or oxygen-enriched air 60 and steam 115 to convert black liquor 80 to raw gas 3 and recovered solids solution 5.

For high-temperature gasifier designs the recovered solids solution 5 is the quench liquid used to cool the product gas within the gasifier. For low-temperature gasifier designs the recovered solids solution 5 consists of the solids produced during gasification that are dissolved in weak caustic solution or water. (If the operating temperature of the gasifier does not exceed the softening temperature of the solids, it is considered to be a low-temperature design, otherwise it is considered a high-temperature design.) Raw gas 3 is relatively hot, and is cooled by heat recovery unit 4 to a usable temperature.

The heat recovery unit 4 may include high-temperature particulate removal. The recovered particulate 41 is routed to the chemical recovery unit 6 to recover chemical by-products similar to those recovered from the gasifier in the recovered solids solution 5. Cooled raw gas 7 containing contaminants, such as particulates and corrosive compounds like acid gases, is passed to gas cleanup unit 8 which may include a wet scrubber or condensing heat exchanger. Gas cleanup unit 8 is used to remove as many contaminants as possible from cooled raw gas 7 to produce clean gas 15.

Scrubbing liquor 86 produced by gas cleanup unit 8 is sent to chemical recovery unit 6. The recovered solids solution 5 produced by black liquor gasifier 2 are also received by chemical recovery unit 6. Chemical recovery unit 6 is used to further process the green liquor 85 and recovered solids solution 5 to recycle as much usable material as possible. Carbonate liquor 9 produced by the chemical recovery unit 6 are returned to gas cleanup unit 8 for further processing and to recover as much usable chemicals from raw gas 7 as possible. Green liquor 85 is the final by-product of the gasifier system 10, and may be further employed for recycling chemicals therefrom, or disposed of in a known manner.

The clean gas 15 supplied from the gasifier system 10 by gas cleanup unit 8 is provided to diesel engine/generator 20 for combustion in a dual-fuel mode. Air 61 and auxiliary fuel 75 are added to the clean gas 15 in the diesel engine/generator 20 to provide the necessary compression ignition for operation. The diesel engine/generator 20 produces electric power 100 and exhaust gases 25.

Optionally, exhaust gases 25 may be directed to a boiler 30 of a heat recovery steam generator, where the exhaust gases 25 are combined with air 61 and fuel 70 to produce high pressure steam 120 and flue gas 110. The flue gas may be processed in a gas cleanup unit 40 to remove particulates, SOx and NOx as needed to produce an acceptable gas 130 for discharge to the atmosphere.

One application of the combined cycle system described using a black liquor gasification system 10 and diesel engine/generator 20 is in a paper mill (not shown). Paper mills now require larger amounts of electrical energy relative to steam production than in the past. Several diesel engine/generators 20 may be connected to fully utilize the clean gas 15 provided from the gasifier system 10 to produce electrical power. Further, the increased chemical recovery capacity provided by the black liquor gasifier 2 improves the environmental impact of the paper mill.

The diesel engine/generator has several advantages over gas turbines as well. The gas cleanup unit 8 does not have to be as efficient as a unit providing clean gas 15 to a gas turbine, since the diesel engine/generator is more tolerant of contaminants in the gas 15 and can combust impurities. The diesel engine/generator 20 is more efficient at rated load than gas turbines of comparable size. The diesel engine/generator 20 is also more efficient at varying loads than a gas turbine of comparable size. This improves efficiency at reduced loads, which is desirable since the gasifier 10 must follow overall process demands.

The relative sizes of diesel engine/generators 20 and gasifier systems 10 allows for incremental increases in capacity to existing industrial plants, thereby eliminating the need for a single expensive system overhaul and allowing the cost of improvement to be spread over several months or years, while the benefits of the system may realized immediately. The use of several diesel engines/generators 20 improves efficiency at reduced loads by permitting individual engine/generators 20 to be shut down as the total load is reduced. This is a desirable capability to follow process needs imposed on the gasifier 10.

While gasifier system 10 is shown being of the type which converts a black liquor 80 to a usable clean gas 15 for combustion, it is within the scope of this invention to substitute a biomass gasifier system and biomass for the gasifier system 10 and black liquor 80, respectively.

While a specific embodiment of the invention has been shown and described in detail to illustrate the application of the principles of the invention, it will be understood that the invention may be embodied otherwise without departing from such principles.

I claim:

1. A combined cycle power generation and chemical recovery system comprising:

gasifier means for producing a fuel gas from a by-product of an industrial process, said gasifier means including a chemical recovery unit for recovery of chemical by-products from the industrial process, said gasifier means further including a gas cleanup unit for cleaning the fuel gas;

a diesel engine/generator connected to the gasifier means to receive and burn the fuel gas for combusting the fuel gas in a dual fuel mode to produce electrical power; and a boiler connected to the diesel engine/generator to receive an exhaust gas from the diesel engine/generator for use in producing a high pressure steam.

2. A system according to claim 1, wherein the gasifier means comprises a gasifier for receiving the by-product of an industrial process and generating a raw fuel gas and a recovered solids solution;

heat recovery means connected to the gasifier for cooling the raw fuel gas;

the gas cleanup unit being connected to the heat recovery means for removing at least some contaminants from the cooled raw fuel gas;

and the chemical recovery unit connected to the gasifier and to the gas cleanup unit for recovering usable compounds from the at least some contaminants and the recovered solids solution.

3. A system according to claim 2, wherein the gasifier is a black liquor gasifier.

4. A system according to claim 3, wherein the by-product of an industrial process is a black liquor.

5. A system according to claim 2, wherein the gasifier is a biomass gasifier.

6. A system according to claim 1, wherein said high pressure steam is supplied to said gasifier means.

7. A system according to claim 1, wherein a portion of the fuel gas is supplied to the boiler.

* * * * *